H. A. STONE.
FOLDING TABLE.
APPLICATION FILED MAY 27, 1912.
1,065,476.
Patented June 24, 1913.
2 SHEETS—SHEET 1.
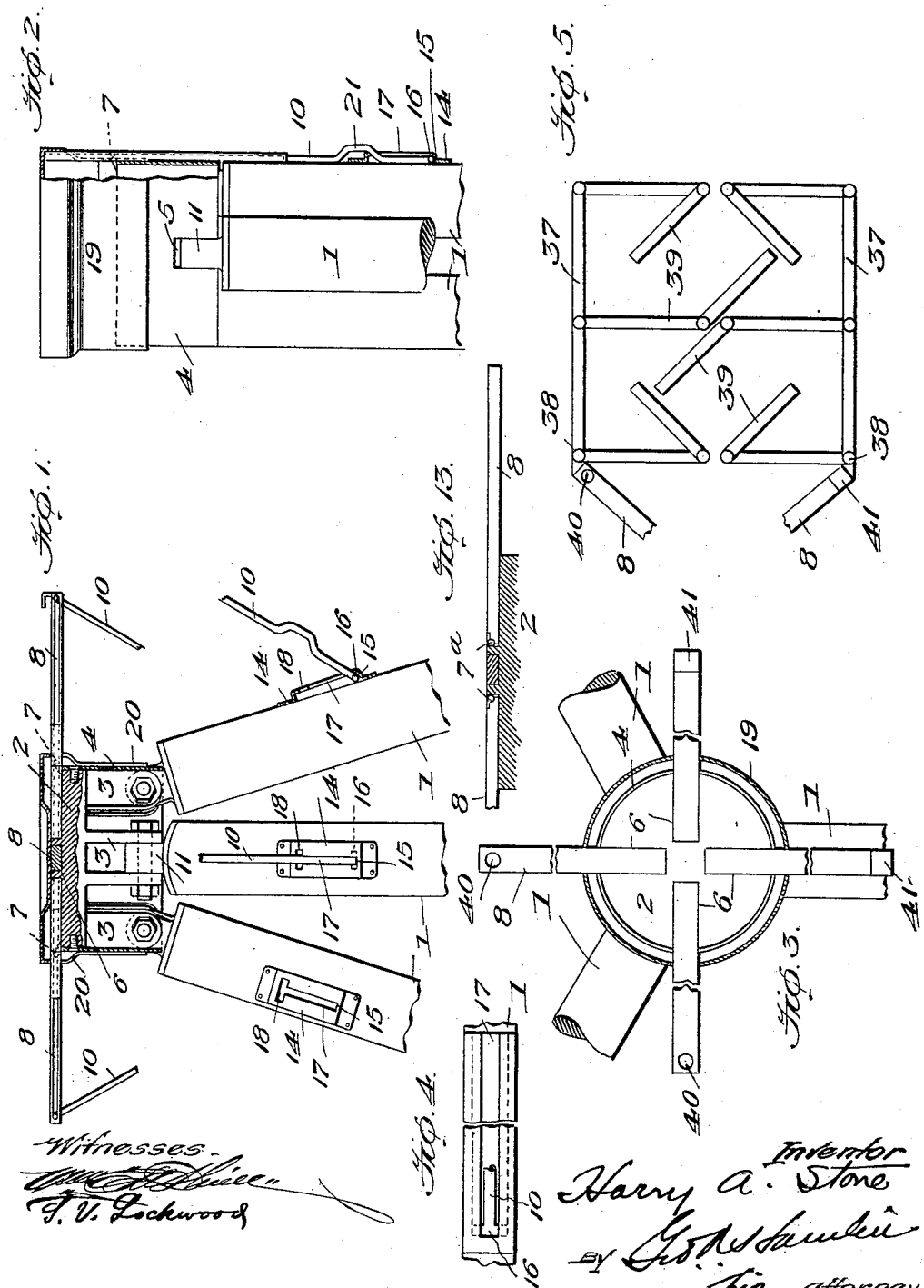

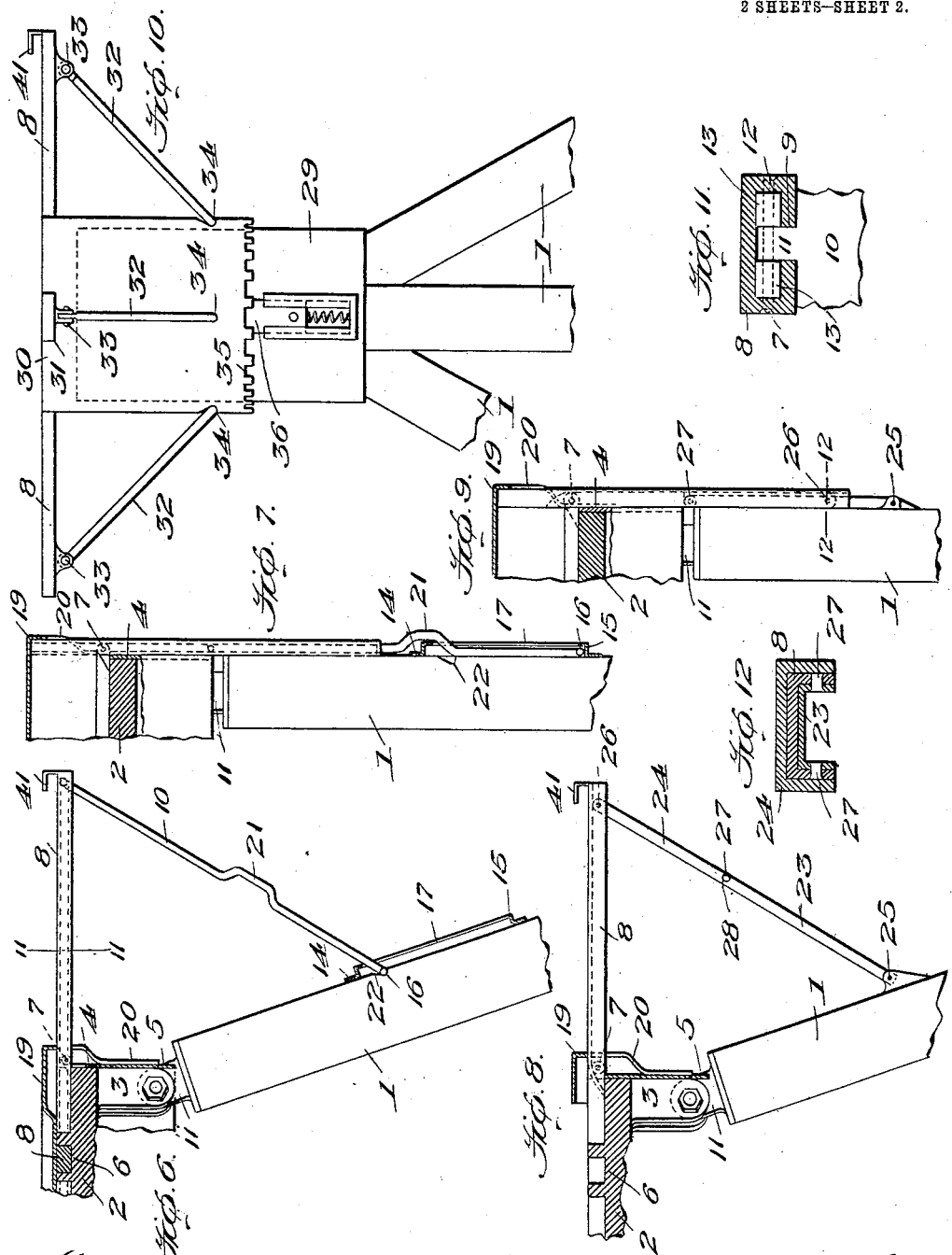

UNITED STATES PATENT OFFICE.

HARRY A. STONE, OF OMAHA, NEBRASKA.

FOLDING TABLE.

1,065,476.     Specification of Letters Patent.     Patented June 24, 1913.

Application filed May 27, 1912. Serial No. 699,959.

*To all whom it may concern:*

Be it known that I, HARRY A. STONE, a citizen of the United States, residing at Omaha, county of Douglas, and State of Nebraska, have invented certain new and useful Improvements in Folding Tables, of which the following is a specification.

This invention relates to folding tables.

My object is to provide a table, particularly adapted to support a typewriter, of simple, light, strong and durable construction having a skeleton top, braces therefor, and a head, all of novel construction arranged and adapted for folding into compact form or to be opened out ready for use, both operations being capable of quick and easy accomplishment.

A further object is to provide folding legs which are constructed and adapted for co-operation with the top in a new manner.

Another object is the provision of novel means on the skeleton top, whereby the legs of a typewriter may be securely held.

A further object is the provision of a novel foldable extension leaf adapted for connection to the foldable head.

A still further object is to provide a folding table having a novel rotatable top.

The invention embodies certain novel features and combinations of parts more fully set forth hereinafter.

In the accompanying drawings:—Figure 1 is a view partly in elevation and partly in section, with certain parts broken away, showing the table in extended condition; Fig. 2, a similar view of the table when folded; Fig. 3, a horizontal section through the outer cap, looking down on the inner ends of the arms constituting the foldable top; Fig. 4, a detail of the connection between a brace and one of the tripod legs; Fig. 5, a plan view of the foldable extension leaf which may be used in connection with the arms; Fig. 6, a view of a modification partially in section and with parts broken away, shown extended; Fig. 7, a similar view when folded; Fig. 8, a view of another modification extended; Fig. 9, a view thereof when folded; Fig. 10, an elevation of a modification having a rotatable top; Fig. 11, a cross section on the line 11—11, Fig. 6; Fig. 12, a section on the line 12—12, Fig. 9; and Fig. 13, a detail view of a modification having no braces.

The legs 1 may be of any preferred construction, but I preferably employ a tripod, the legs of which may or may not be interbraced. The head 2, which is either circular or polygonal, the former shape being shown, has depending ears 3 to which the legs 1 are pivoted. Secured to and surrounding the head 2 is a depending shell 4 which is provided with slots 5 which receive the upper ends of the tripod legs 1, and when the latter are extended, thereby bracing said legs and taking some of the strain off of the pivotal connections between the legs and the ears 3.

The head 2 is provided with radial grooves 6. Pivoted at 7 to suitable ears on the head 2 or the shell 4, are arms 8 whose inner ends lie in the recesses 6, thus bracing the arms 8 and relieving the pivot 7 thereof of strain when said arms are in the extended position shown in Figs. 1, 3, 6, 8 and 10. The arms 8 are of the cross-sectional shape shown in Fig. 11 in the constructions of Figs. 1 and 6 and may be of that construction in the form shown in Fig. 8, although not necessarily so. As shown in Fig. 11, the arms are hollow, preferably rectangular in cross section, and provided with a longitudinal slot 9 in their lower faces.

Braces 10 are provided with a reduced end 11, Fig. 11, projecting through the slot 9 and provided with a pin 12 which may or may not be provided with rollers 13. The connection between the brace 10 and the arm 8 is a sliding one in Figs. 1 and 6 and may be in Fig. 8.

Referring to Figs. 1, 4 and 6, the legs 1 have secured thereto plates 14 which are provided at their lower ends with rests or seats 15. The braces 10 have feet 16 which are wider than the slot 17 in the plate 14 so that they will not become detached therefrom, but there is provided an entrance slot 18 of a size and shape to permit the entry of the feet 16 or their removal from the plates 14. Instead of employing the slot 18, the upper end of the plate 14 may be left open, as shown in Fig. 4.

Telescoping over the head 2 and the shell 4 is a cap 19 which is provided with slots 20 that receive the arms 8 and brace them. As shown in Fig. 2, when the cap 19 is raised, the arms 8 may be folded downwardly, turning on their pivots 7, but when the cap is down, it rests against the inner ends of the arms 8 and holds them in their grooves or channels 6.

In folding the construction shown in Figs.

1 and 2, the cap 19 is raised sufficiently high, without detachment from the shell 4, to permit the arms 8 to be turned on their pivots 7. To compensate for the length of the braces 10 during the folding movement, the legs 1 may be folded at the same time that the arms 8 and braces 10 are being folded. During the folding movement, the pins 12 and the rollers 13 travel in the arms 8, the parts finally assuming the position shown in Fig. 2. A bent or off-set part 21 is provided in each brace so that the braces may lie flat against the legs 1.

In the modification shown in Figs. 6 and 7, the arms 8 and braces 10 are of the construction previously set forth and plates 14 are used as before. The feet 16 are, however, adapted to engage notches 22 in the legs 1, disposed toward the upper ends of the plates 14. By slightly lifting the arms 8, the feet 16 are sprung out of the notches 22 and may then slide down in the plates 14. The braces are slidably connected to the arms 8.

In the modification shown in Fig. 8, the braces may be slidably connected to the arms 8, but need not be so connected. The braces are formed in two parts 23, 24, the former being pivoted at 25 to the leg and the latter being pivoted at 26 to the arm 8, although it may be slidably connected thereto, as shown in Fig. 11 and previously described. The parts 23 and 24 are pivoted together at 27, a rule joint or the like 28 being provided to lock the brace sections together when in extended position.

Referring to Fig. 12, the arm 8 is of channel form in cross-section and is adapted to receive the section 24 which is also of channel form. The section 23 may be solid or of channel form. As shown in Fig. 12, when the brace sections and the arm are folded, all lie one within the other.

In the modification shown in Fig. 10, the tripod legs 1 are pivoted to and within a suitable cylindrical or tubular head 29 over which is telescoped so as to be adapted to rotate thereon, a cap 30 having radial channels 31 in its upper face which receive the inner ends of the arms 8 in the manner heretofore set forth. Braces 32 are pivoted to the arms at 33 and have their lower ends adapted to rest on seats 34 provided in the cap 30. In folding, the arms 8 are adapted to spring upwardly to release the braces from the seats 34 and the braces and arms are then adapted to fold downwardly against the exterior of the cap 30. The lower edge of the cap 30 is provided with teeth 35 adapted to be engaged by a spring-actuated latch 36 carried by the head 29. By releasing the latch 36, the cap 30 and the arms may be readily rotated to position any object carried by the arms as may be desired. If, for instance, a typewriter is supported on the arms 8, the cap 30 and arms may be turned to dispose it in any suitable position in relation to the user, without having to turn the entire table.

In Fig. 13, the arms 8 are hinged at their inner ends 7ª and have parts lying in the recesses 6, the braces 10 being dispensed with. The arms fold upwardly.

The folding extension leaf shown in Fig. 5 may be applied to the ends of any two of the arms 8 of any of the forms described. This leaf is composed of members 37 pivoted to the ends of the arms 8 at 38 and carrying articulated members 39 which can be opened out to form a skeleton or may be folded against the members 37 to which they are attached and in substantial extension or alinement with the arms 8 so as to form continuations thereof adapted to be folded with said arms and with the braces 10.

I preferably provide in two of the braces 8, the depressions 40 adapted to receive the rear legs of the typewriter. At the ends of the remaining arms 8, are overhanging flanges 41 adapted to engage the front legs of the typewriter. The flanges 41 are particularly designed to engage and hold against tipping the legs of those typewriters which have off-set parts or feet. The table may be used without the flanges 41 and depressions similar to the depressions 40 may be substituted to adapt the table for the support of any standard typewriter, or, other means may be employed for attaching the typewriter to the arms 8.

I am aware that modifications of structure may be resorted to in carrying out my invention and I do not limit myself to the precise constructions herein set forth, but consider that I am entitled to all variations falling within the spirit and scope of the invention.

Having thus described my invention, what I claim as new and desire to secure by Letters Patent, is:—

1. In a folding table, the combination with a center member, of supporting legs therefor, and a skeleton top having arms hinged to the center member intermediate their ends, the inner end parts of the arms being adapted to overlap the center member.

2. In a folding table, the combination with a center member, of supporting legs therefor, and a skeleton top having arms hinged to the center member intermediate their ends, the inner end parts of the arms being adapted to overlap the center member, and means for preventing the arms from moving up or down or laterally when in extended position.

3. In a folding table, the combination with a center member, of legs therefor, a skeleton top having arms hinged intermediate their ends to the center member, the inner end parts of the arms overlapping the center member, and arm supporting braces jointed to the arms and engaged with the legs, said braces being adapted to fold with the arms.

4. In a folding table, the combination with a center member, of supporting legs therefor, a skeleton top having arms hinged to the center member intermediate their ends, their inner ends overlapping said center member, and a cap fitting over the center member and over the inner overlapping parts of the arms.

5. In a folding table, the combination with a center member, of supporting legs therefor, a skeleton top having arms hinged to the center member intermediate their ends, their inner ends overlapping said center member, and a cap fitting over the center member and over the inner overlapping parts of the arms, said cap having slots which receive the arms beyond the margin of the center member.

6. In a folding table, the combination with a center member having radial channels, of arms hinged to the center member beyond the outer ends of said channels and constituting a skeleton top, supporting legs for the center member, and a cap fitted over the center member and bearing upon the parts of the arms that lie in the channels and having slots that receive the arms beyond the margin of the center member.

7. In a folding table, the combination with a center member having channels, of arms hinged to the center member beyond the outer ends of said channels and constituting a skeleton top, supporting legs for the center member, and foldable braces for supporting the arms from the legs, whereby the parts of the arms are retained in the channels.

8. In a folding table, the combination with a center member and a shell depending therefrom, of pivoted foldable legs, the depending shell having slots receiving the legs below their pivotal connection with the center member.

In testimony whereof, I hereunto affix my signature in presence of two witnesses.

HARRY A. STONE.

Witnesses:
J. P. FLICK,
MARGUERITE SHAW.

---

Copies of this patent may be obtained for five cents each, by addressing the "Commissioner of Patents, Washington, D. C."